United States Patent [19]

Papenfuhs

[11] 4,042,582

[45] Aug. 16, 1977

[54] MIXTURES OF DISAZOMETHINE AND MONOAZO METHINE COMPOUNDS, PROCESS FOR THEIR PREPARATION AND THEIR USE AS PIGMENTS

[75] Inventor: Theodor Papenfuhs, Frankfurt am Main, Germany

[73] Assignee: Hoechst Aktiengesellschaft, Frankfurt am Main, Germany

[21] Appl. No.: 561,935

[22] Filed: Mar. 25, 1975

[30] Foreign Application Priority Data

Mar. 30, 1974 Germany .............................. 2415550

[51] Int. Cl.$^2$ .......................................... C07C 119/00
[52] U.S. Cl. ............................... 106/288 Q; 252/182; 260/566 F

[58] Field of Search ...................... 260/566 F, 240 G; 252/182

[56] References Cited

U.S. PATENT DOCUMENTS

| 2,181,122 | 11/1939 | Downing et al. ....................... 23/250 |
| 2,405,886 | 8/1946 | Hardman .......................... 260/566 F |
| 3,457,301 | 7/1969 | Lenoir et al. ......................... 260/519 |

Primary Examiner—Gerald A. Schwartz
Attorney, Agent, or Firm—Connolly and Hutz

[57] ABSTRACT

Mixtures of mono- and disazomethine compounds are obtained by reacting 1.2 to 2.5 mols of an optionally substituted m-phenylene diamine with 2 mols of one or more optionally substituted 2-hydroxy-1-naphthaldehydes. The products are pigments having superior properties than the components.

11 Claims, No Drawings

MIXTURES OF DISAZOMETHINE AND MONOAZO METHINE COMPOUNDS, PROCESS FOR THEIR PREPARATION AND THEIR USE AS PIGMENTS

This invention relates to mixtures of water-insoluble disazo-methine and monoazomethine compounds, a process for their preparation and their use as pigments.

Cross-Reference to Related Application

Copending patent application Ser. No. 438,246, filed Jan. 31, 1974, describes water-insoluble disazomethine dyestuffs of the general formula

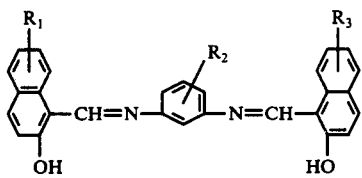

(Ia)

wherein $R_1$, $R_2$ and $R_3$ each represents hydrogen or non-ionic substituents, and $R_1$ and $R_3$ may be the same or different.

The invention of said patent application also provides a process for the preparation of these dyestuffs wherein either 1 mole of one or more diamines of the formula (II)

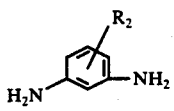

(II)

wherein $R_2$ is defined as above, is condensed with 2 moles of one or more compounds of the formula

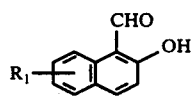

wherein $R_1$ is defined as above, or 1 mole of a monoazomethine dyestuff of the formula

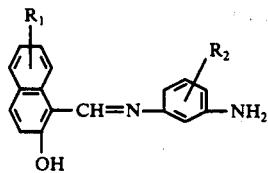

wherein $R_1$ and $R_2$ are defined as above, is condensed with 1 mole of a compound of the formula

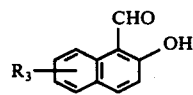

wherein the radicals $R_1$ and $R_3$ may be the same or different.

It was now found that mixtures of water-insoluble disazomethine compounds of the formula (Ia)

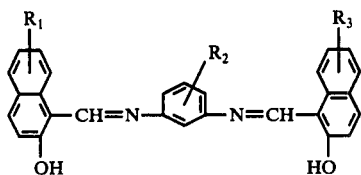

(Ia)

and water-insoluble monoazomethine compounds of the formula (Ib)

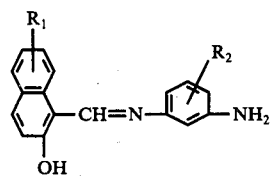

(Ib)

wherein the radicals $R_1$, $R_2$ and $R_3$ may be the same or different, and each stands for a hydrogen atom or a non-ionic substituent, preferably mixtures in a molar ratio of (one or more) disazomethine compounds to (one or more) monoazomethine compounds of 2 : 1 to 1 : 3, preferably 1 : 2, have considerably improved properties as pigments, especially a higher tinctorial strength, than the individual components and mechanical mixtures of the individual components.

Suitable non-ionic substituents $R_1$, $R_2$ and $R_3$ are, for example halogen atoms, for example chlorine or bromine atoms, lower alkyl groups, for example methyl, ethyl or propyl groups, lower alkoxy groups, for example methoxy, ethoxy or propoxy groups, cyano groups, nitro groups, lower alkyl or arylsulfone, especially phenylsulfone groups, carboxylic acid ester, especially lower carboalkoxy groups, or optionally substituted sulfonic acid amide or carboxylic acid amide groups, especially mono- or di-(lower alkyl) amides.

The term "lower" in connection with alkyl moieties is intended to define groups of 1 to 6, preferably 1 to 4, especially 1 to 3 carbon atoms.

The new dyestuff mixtures exist probably in the form of mixed crystals.

Of the new pigment mixtures are preferred those in which the disazomethine dyestuff and the monoazomethine dyestuff is contained in a molar ratio of 2 : 1 to 1 : 3, especially 1 : 2.

Further especially preferred dyestuff mixtures of the formulae (Ia) and (Ib) mentioned above are those in which $R_1$ is hydrogen, a chlorine or bromine atom or an alkoxy group of 1 to 3 carbon atoms, especially the methoxy group, $R_2$ is a hydrogen atom, a chlorine or bromine atom or an alkyl group of 1 to 3 carbon atoms, especially the methyl group, or an alkoxy group of 1 to 3 carbon atoms, especially the methoxy group, a carboxylic acid amide or an acetamido group and $R_3$ stands for a hydrogen atom or an alkoxy group of 1 to 3 carbon atoms, especially the methoxy group, and among these, there are especially to be mentioned the dyestuff mixtures which consist of the dyestuffs of formula (Ia) and (Ib) in which $R_1$, $R_2$ and $R_3$ each stands for a hydrogen atom.

The dyestuff mixtures are prepared according to the invention by reacting adavantageously more than 1 mol of one or more diamines of the formula (II)

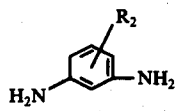

(II)

in which $R_2$ is defined as above, with 2 moles of one or more compounds of the formula (III)

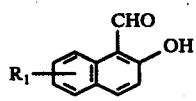

(III)

in which $R_1$ stands also for $R_3$ and is defined as above.

In this condensation reaction, the diamines of the formula (II) are most advantageously introduced into the reaction mixture in an amount of 1.2 to 2.5 mols, preferably 1.5 to 2 mols, calculated on 2 moles of the compounds of the formula (III). The condensation reaction of compounds (II) with compounds (III) can be carried out in a neutral or acidic aqueous, aqueous-organic or organic medium. However, especially preferred is a process in which the diamines of the formula (II) are condensed, preferably under inert lower gas with the aldehydes of the formula (III) at 20° – 70° C in a neutral aqueous medium under mechanical mixing and grinding conditions acting at least from time to time.

The process is advantageously carried out by heating the reactants at a ratio exactly or nearly stoichiometric in aqueous suspension or emulsion, starting at a temperature of about 10° – 30° C, preferably at about 20° C, which is raised during several hours steadily to about 50° – 80° C, preferably about 60° – 70° C.

To make the suspension of emulsion of the reaction mixture as homogeneous as possible, it is advantageous to create a shearing, permanently or at intervals, by means of grinding aggregates providing a fine dispersion, for example, wet mills, dissolvers, bead or sand mills, dispersing devices and others. These apparatuses may also serve as reaction vessels, but with special advantage, may be put in a pump line or in shunt of a normal vessel fitting. The addition of a usual dispersant or emulsifier may also be advantageous.

By working in this manner, the continuous laying bare of new surfaces leads to a quantitative conversion and a very homogeneous grain of the pigment formed.

According to the preferred operational method, the pigments are obtained in excellent purity and yield and in a fine dispersion especially favorable for its further use as pigment dyestuff, so that an additional finish often is not necessary.

Because the final products are water-insoluble and notable excesses of one or the other of the reactants may be dispensed with, the mother liquors are practically free from organic and inorganic compounds and can, therefore, be fed into the waste water. They may, however, also be reused in subsequent reaction batches, which means that the process of the invention works practically without producing waste water.

Because the mother lyes can generally be reused for the following reaction mixture a reactant, if water-soluble, can also be used in excess, for example in an amount of 10 – 200 %, because it can be recycled and must only be brought to the original molar ratio to be reacted. This operational method frequently allows shorter reaction times or lower reaction temperatures which leads to an even more favorable space-time yield and a reduced expenditure of energy.

Suitable organic solvents for the use as reaction medium are, for example alcohols, especially lower alkanols for example ethanol, iso-propanol or butanol, aliphatic carboxylic acids, especially lower alkanoic acids, for example formic acid or acetic acid, dimethyl formamide, xylene, chlorobenzene, o-dichlorobenzene or nitrobenzene. The reaction usually performs rapidly with a quantitative yield, calculated on the aldehyde, at a temperature of from 50° to 100° C. It may be advantageous in certain cases to carry out the pigment preparation in a solvent or solvent mixture at a higher temperature for example at 150° C or up to 180° C, and to remove at the same time by an azeotropic distillation the water which is fromed during the condensation.

According to the invention, the new pigment mixtures can also be prepared by reacting advantageously one or more monoazomethine dyestuffs of the formula (Ib) defined above with one or more hydroxynaphthalene aldehydes of the above formula (III). In this condensation reaction, the hydroxynaphthaldehydes of the formula (III) are most advantageously introduced into the reaction mixture in an amount of 0.1 to 0.8 mol, preferably 0.3 to 0.6 mol, calculated on 1 mol of the monoazomethine dyestuff of the formula (Ib). To perform this process, the same reaction conditions are applied as for the process mentioned first, the condensation reaction in neutral aqueous medium at 20° – 70° C under mechanical mixing and grinding conditions acting at least from time to time, preferably under inert gas, being preferred also in this case.

The monoazomethine dyestuffs of the formula (Ib), which are used as starting compounds for the operational method of this invention, can be prepared, for example, by effecting the condensation of the diamine with the aldehyde in an alcoholic medium at a low temperature (0° to 20° C) and in the absence of an acid.

It may be advantageous during the condensation of very oxidation-sensitive m-phenylene diamines to use them in the form of their salts with mineral acids and to effect the reaction by adding an at least equivalent amout of ammonia, an ammonium salt or an aliphatic, aromatic or heterocyclic amine, for example triethyl amine, N,N-dimethylaniline or pyridine.

The 1-naphthaldehydes of the formula (III) — which are used as starting compounds — can be obtained according to known methods, for example, by reacting a suitable 2-hydroxynaphthalene with chloroform in an aqueous or aqueous-alcoholic medium in the presence of sodium hydroxide solution, or by reacting a 2-hydroxy-naphthalene with hexamethylene tetramine and formaldehyde in the presence of acetic acid and/or its anhydride and, if necessary, in the presence of a mineral acid (cf. German Pat. No. 952,629).

The mixtures of the invention are valuable yellow pigments, which are particularly suitable for use in printing pastes. They can also be used for the pigementation of high-molecular-weight organic materials, for example cellulose ethers, cellulose esters such as acetyl cellulose or nitrocellulose, polyamides, polyurethanes, polyesters, natural resins or synthetic resins, for example aminoplasts, in particular urea- and melamine-formaldehyde resins, alkyd resins, phenoplasts, polycarbonates, polyolefins, for example polyethylene or polypropylene, polyvinyl chloride, polyacrylonitrile, polyacrylates, rubber, casein, silicones and silicone resins, either individually or in mixtures thereof. The organic materials may be in the form of plastic or molten masses, or in the form of spinning solutions, lacquers or printing pastes. Depending on the intended purpose, it may be advantageous to use pigments of the invention as toners or in the form of preparations.

As compared to the compounds set forth in the initially mentioned patent application, the new pigments stand out by a still higher tinctorial strength, clear shades, high transparency as well as excellent storage stability and rheological properties in lithoprinting varnishes.

The higher tinctorial strength of the new products is especially surprising and can only obtained according to the operational methods of the invention. Mechanically prepared mixtures of separately synthesized individual pigments of formulae (Ia) and (Ib) do not show this phenomenon.

The pigments of the invention show such a high effect of increased tinctorial strength, that very simple techniques are sufficient to prepare products in an extremely economical way that have in comparison with commercial products the same or, in special cases, even a higher tinctorial strength.

It is noteworthy that with a given proportion of the starting components and using constant condensation processes, azomethinedyestuff mixtures can be prepared in reproducible manner and having a composition remaining the same.

Because of the interrupted conjugation due to the linkage in tne meta position, the dyestuffs show the desired neutral yellow shade, for which there is an increasing demand caused by the standardization of color shades for multi-color printing. Therefore, they are appropriate to a high extent as yellow components in multi-color paper printing and, on account of their far more favorable storage and flow characteristics, they represent a considerable technical advantage in comparison to the dyestuffs hitherto used for this purpose.

Compared to the structurally closest related dyestuffs having orange to red shades, as disclosed in U.S. Pat. No. 2,405,886, the pigments according to the present invention have essentially improved tinctorial strength, flow and printing properties in printing pastes which are prepared with them.

The following Examples illustrate the invention. Parts and percentages are by weight.

EXAMPLE 1

A mixture consisting of 334 parts of 2-hydroxyl-1-naphthaldehyde, 216 parts of m-phenylene diamine (molar ratio of aldehyde to diamine: 1 : 1), 3 parts of resin soap and 300 parts of water were recycled by pumping by means of a corundum disc mill with the exclusion of air for 4 hours at 30° – 40° C whereupon a yellow suspension was obtained which was heated to 70° C for 15 minutes, filtered and the filter residue was dried.

471 Parts of a yellow pigement were obtained; the pigment was suitable for the preparation of intaglio printing pastes based on toluene with good fluidity and tinctorial strength.

On account of analyses of the dyestuff mixture obtained (quantitative thin layer chromatography) and the condensation mother liquor (residual content of m-phenylene diamine by diazotization) its composition is to be illustrated by the following formula:

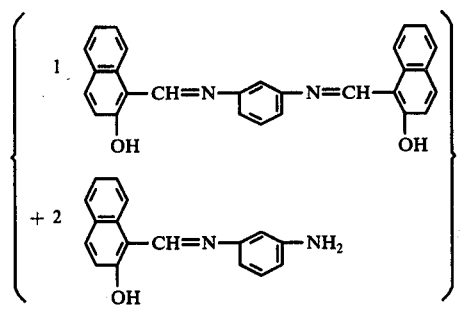

The yield is quantitative and reproducible, the mother liquid can be reused for the next batch after the reaction components have been adjusted to the proportion indicated above, so that there is no loss of diamine.

The pigment so prepared has an essentially higher tinctorial strength than each of the individual pigments prepared separately and mechanically produced mixtures of these individual components.

When 10 % of an alkanol were added to the water, heating is no longer necessary.

EXAMPLE 2

34.4 Parts of 2-hydroxy-1-naphthaldehyde were dissolved in 150 parts of glacial acetic acid at 80° C. 19.5 Parts of 2-methyl-m-phenylene diamine, dissolved in 100 parts of glacial acetic acid were added dropwise while stirring within 10 minutes; (molar ratio of aldehyde and diamine : 2.0 : 1.6). The reaction mixture was stirred for 45 minutes at 80° C, cooled to 20° C and the precipitated pigment mixture was isolated. According to the analyses indicated in Example 1, it had the following formula:

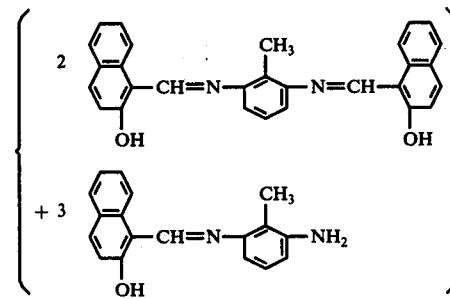

After washing the filter resiude until neutral and drying, a yellow pigment of high tinctorial strength was obtained which was highly suitable for the preparation of printing pastes, wherein it exhibited excellent storage stability.

When in the above reaction mixture 2-methyl-m-phenylenediamine is replaced by the same amount of 4-methyl-m-phenylene-diamine and the reaction is carried out in the same manner, as indicated above, a dyestuff mixture was obtained which had the following composition:

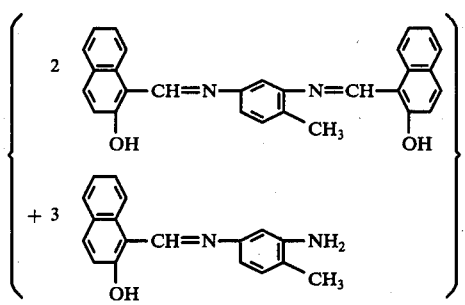

The yield is the same and the product shows a similar shade and the same properties.

EXAMPLE 3

51.6 Parts of 2-hydroxy-1-naphthaldehyde were dissolve at 85° C in 500 parts of formic acid, a solution of 29.9 parts of 4-chloro-m-phenylene diamine was added dropwise to 200 parts of formic acid within an hour (molar ratio of the reaction components: 3 : 2.1). This reaction mixture was stirred for an hour at the boiling temperature, the hot solution was introduced, while stirring, into a mixture of 4000 parts of water and 12 parts of resin soap at a mixing temperature below 70° C. The product precipitated therefrom was suction-filtered, washed until neutral and dried. According to the analyses indicated in Example 1, it corresponds to an equimolar mixture of mono- and disazomethine compound and has the following composition as shown in the formula:

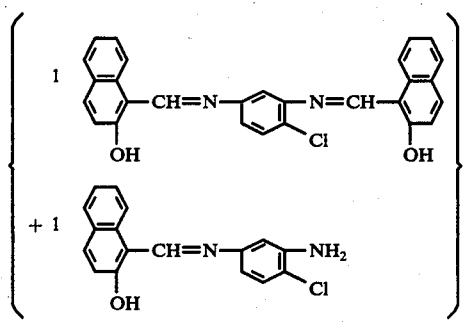

75 Parts of this yellow pigment were obtained which was characterized by an excellent dispersibility when incorporated into printing pastes, and which was highly suitable for the preparation of intaglio pastes having good tinctorial strength and storage stability which makes it clearly superior to the individual components in this regard. The shade of this pigment mixture corresponded to the standard yellow color of the DIN scale (German Industrial Standard) so that no adjustment of the shade was necessary.

When using instead of the diamine mentioned above the corresponding of 4-bromo-m-phenylenediamine in the molar ratio indicated above, 84 parts of a dyestuff mixture were obtained which had the following composition:

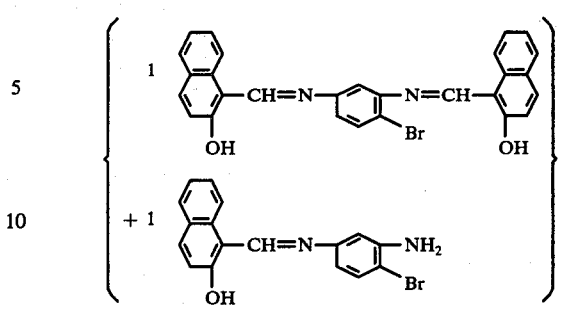

It had a somewhat more greenish yellow shade and similar good properties as the product mentioned above, such as its dispersibility in printing pastes, its storage stability in these printing pastes and the tinctorial strength.

EXAMPLE 4

25.8 Parts of 2-hydroxyl-1-naphthaldehyde were dissolved in 400 parts of ethanol at 60° C. 20.7 parts of 2,4-diaminoanisole were added while stirring (molar ratio of aldehyde to diamine: 1 : 1). The reaction mixture was stirred for 3 hours. The yellow precipitate was filtered off, washed with ethanol and water and dried.

Yield: 39 parts of a pigment mixture which had according to the analysis described in Example 1, the following composition:

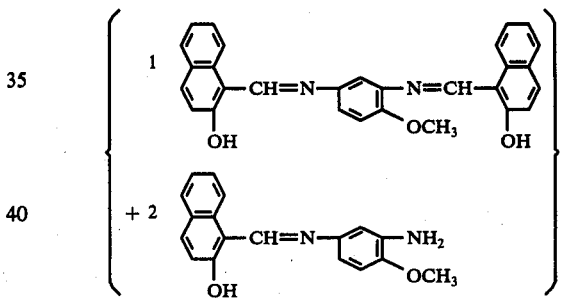

It was obtained with such a degree of purity that no further finish of the pigment was necessary. By dispersing it in commonly used printing varnishes, printing pastes having excellent fluidity and high tinctorial strength and storage stability were obtained.

When methanol or isopropanol were used as solvents in the above reaction mixture instead of ethanol, the same quality and yield was obtained.

EXAMPLE 5

12.9 Parts of 2-hydroxy-1-naphthaldehyde and 15.2 parts of 6-methoxy-2-hydroxy-1-naphthaldehyde (molar ratio: 1 : 1) were dissoled in 150 parts of glacial acetic acid at 80° C. Then, 32.4 parts of a 50 % aqueous m-phenylene-diamine solution (molar ratio of total aldehyde to diamine : 1 : 1) were added dropwise while stirring whithin 1 hour, and the reaction mixture was stirred for another 30 minutes at 80° – 90° C. The reaction mixture was then introduced into 1500 parts of water at 20° C and the precipitated pigment was suction-filtered. After washing and drying, 35 parts of a pigment mixture was obtained which had the following composition as determined by the analyses indicated in Example 1.

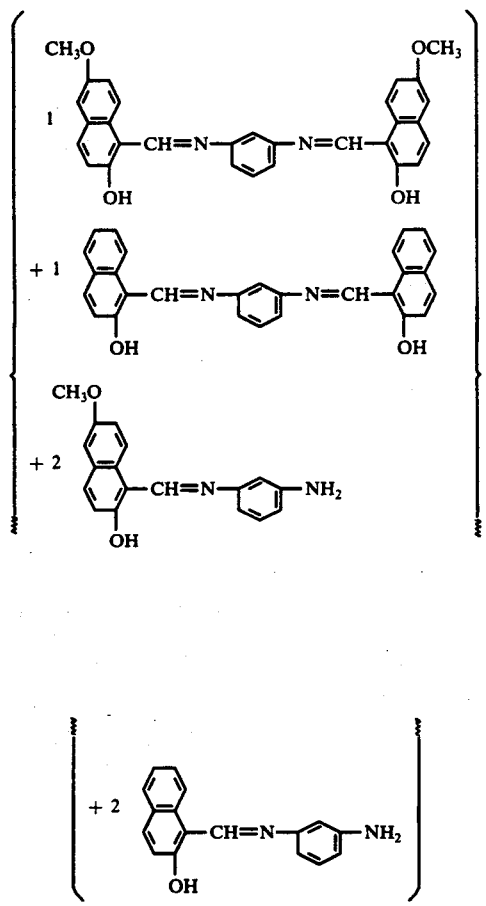

It had excellent properties for printing and showed, in particular, an even higher tinctorial strength than the product obtained according to Example 1. The product was obtained in reproducbile manner.

EXAMPLE 6

20.7 Parts of 6-chloro-2-hydroxy-1-naphthaldehyde were suspended while stirring in 400 parts of isopropanol at 0° C. Then, 18.7 parts of 4-bromo-m-phenylenediamine were added (molar ratio of aldehyde and diamine: 1 : 1). Stirring of the reaction mixture was continued for 3 hours at 0° to 5° C. The so-formed monoazomethine compound of the formula

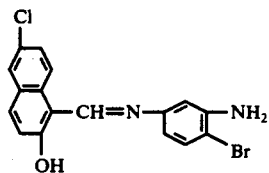

was condensed after the addition of 8.6 parts of 2-hydroxy-1-naphthaldehyde (molar ratio of diamine to aldehyde: 2:1) and 1 part of glacial acetic acid, while heating under reflux for 2 hours, to yield an azomethine mixture of the following composition:

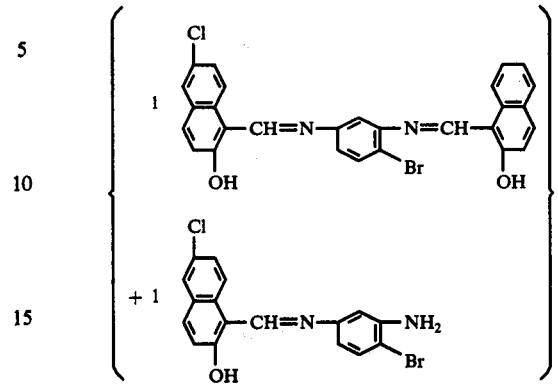

After cooling the reaction solution the mixture obtained in equimolar amounts was separated by filtration, washed with isopropanol and water and dried. 45 parts of pigment were obtained having a neutral yellow shade. It was suitable both for the dyeing of polyvinylchloride in the mass and for the preparation of printing pastes of very high tinctorial strength and storage stability.

When 4-bromo-m-phenylenediamine was replaced by corresponding amounts of 2,4-diamino-benzamide in the molar ratio indicated above, there resulted a pigment having slightly reduced tinctorial strength, but an improved fastness to bleeding (migration) and to solvents. It corresponds to the following formula

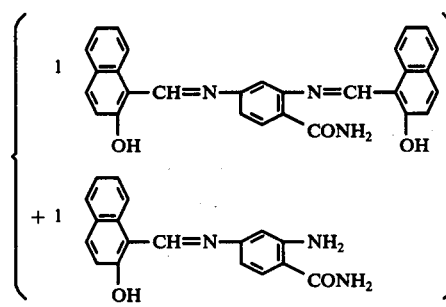

EXAMPLES 7 - 12

When the reaction is carried out as described in Example 1 and 2-hydroxy-1-naphthaldehyde is reacted with m-phenylenediamine using amounts in the molar ratio indicated in the following Table, there were obtained, in quantitative yield, yellow pigments of the invention having the composition indicated in the following Table:

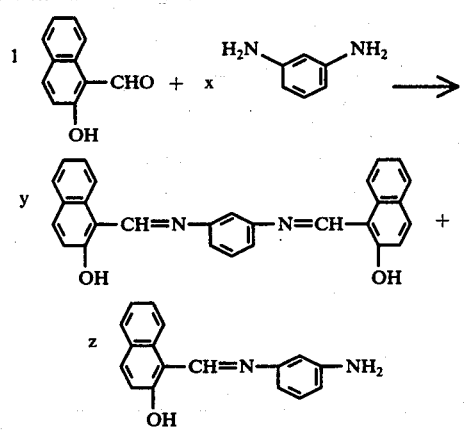

TABLE

| Example | x | y | z |
| --- | --- | --- | --- |
| 7 | 1.5 | 0.35 | 0.65 |
| 8 | 1 | 0.36 | 0.64 |
| 9 | 0.8 | 0.4 | 0.6 |
| 10 | 0.7 | 0.5 | 0.5 |
| 11 | 0.65 | 0.6 | 0.4 |
| 12 | 0.6 | 0.7 | 0.3 |

EXAMPLE 13

25 Parts of 6-bromo-2-hydroxy-1-naphthaldehyde were dissolved in 200 parts of dimethyl formamide at 70° C. Then, 23.8 parts of 2,4-diamino-acetanilide (molar ratio of aldehyde to diamine 1 : 1) were added, the mixture was stirred for 15 minutes and a solution of 15.4 parts of ammonium acetate in 75 parts of glacial acetic acid were added dropwise within an hour. This reaction mixture was again stirred for 2 hours at 70° C and the product so prepared was precipitated by adding 1000 parts of water and isolated by filtration, washed and dried. 34 parts of a pigment were obtained which had, according to the analysis described in Example 1, the following equimolar composition:

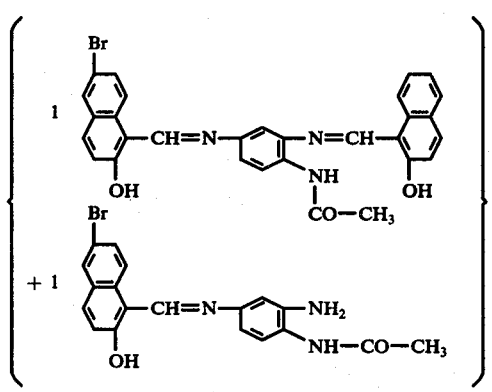

It was very suitable for the preparation of yellow standard printing pastes which stand out by a very high tinctorial strength, excellent flow properties and storage stability. The pigment can also very well be used for the dyeing of plastic materials, wherein its fastness to migration and the high tinctorial strength are remarkable.

I claim:

1. A mixture in a molar ratio of 2:1 to 1:3 of water-insoluble azomethine compounds comprising a compound of the formula (Ia)

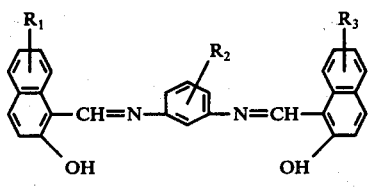

and of the formula (Ib)

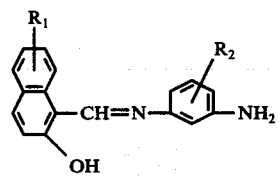

wherein $R_1$, $R_2$ and $R_3$ are the same or different and each is hydrogen, halogen, lower alkyl, lower alkoxy, cyano, nitro, lower alkylsulfone, phenylsulfone, lower carboalkoxy, sulfonic acid amide, carboxylic acid amide, sulfonic acid mono-(lower alkyl)-amide, sulfonic acid di-(lower alkyl)-amide, carboxylic acid mono-(lower alkyl)-amide or carboxylic acid di-(lower alkyl)-amide.

2. A mixture of compounds as defined in claim 1 comprising 2 to 1 mols of a compound of the formula (Ia)

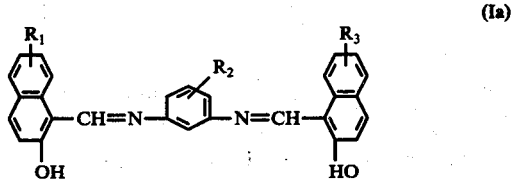

(Ia)

and 1 to 3 mols of a compound of the formula (Ib)

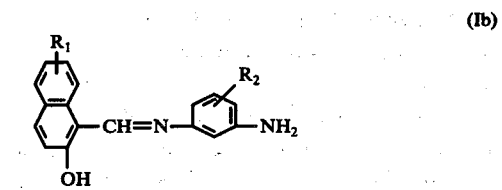

(Ib)

in which $R_1$, $R_2$ and $R_3$ are equal or different substituents selected from the group consisting of hydrogen, chlorine, bromine, alkyl of 1 to 3 carbon atoms, alkoxy of 1 to 3 carbon atoms, carbamoyl or acetamino.

3. A mixture as defined in claim 2, consisting essentially of 2 mols of a compound of formula (Ia) and 1 mol of a compound of formula (Ib) wherein $R_1$ is hydrogen, chlorine, bromine or methoxy, $R_2$ is hydrogen, chlorine, bromine or methyl and $R_3$ is hydrogen or methoxy.

4. A mixture as defined in claim 1 obtained by reacting 1.2 to 2.5 mols of one or more amines of the formula (II)

(II)

-continued

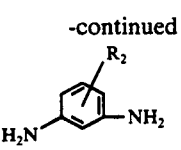

with 2 mols of 1 or more aldehydes of the formula (III)

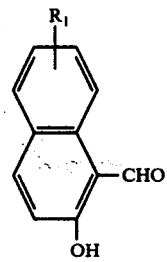

(III)

in which formulae R is equal or different and defined as in claim 1, in a neutral or acidic aqueous suspension or emulsion at a temperature of 10° to 80° C under mechanical agitation.

5. A mixture as defined in claim 4, wherein the temperature is at the beginning at 10° to 30° C and is raised during the reaction to 50° to 80° C.

6. A mixture as defined in claim 5, wherein the temperature is at the beginning about 20° C and is raised at a constant rate to about 60° to 70° C.

7. A mixture as defined in claim 4, wherein the aqueous medium is neutral.

8. A mixture as defined in claim 4, wherein the reaction mixture is ground or sheared continuously or intermittantly.

9. A mixture as defined in claim 4, wherein the reaction is performed under inert gas-cover.

10. A mixture as defined in claim 1 crystallized as mixed crystals.

11. A mixture as defined in claim 1 comprising 1 mol of a compound of the formula

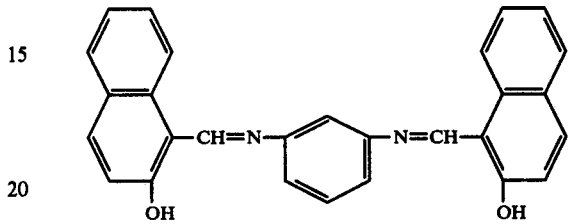

and 2 mols of the compound of the formula

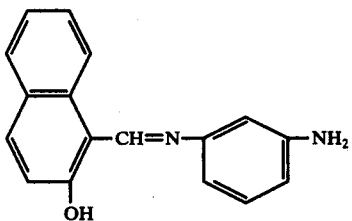

* * * * *